April 28, 1970   R. A. PETERSON   3,508,676
LOADER-SKIDDER

Filed May 23, 1968   4 Sheets-Sheet 1

INVENTOR
ROBERT A. PETERSON

BY
ATTORNEYS

United States Patent Office 3,508,676
Patented Apr. 28, 1970

3,508,676
LOADER-SKIDDER
Robert A. Peterson, San Leandro, Calif., assignor to Caterpillar Tractor Co., Peoria, Ill., a corporation of California
Filed May 23, 1968, Ser. No. 731,434
Int. Cl. B66f 9/18
U.S. Cl. 214—767                    2 Claims

ABSTRACT OF THE DISCLOSURE

A wheeled vehicle having a loader on one end and a skidder on the other end thereof wherein: the axle on the skidder end of the vehicle has been moved nearer that end of the vehicle so as to improve balance; the loader end of the vehicle has mounted thereon a pressure disc for holding a work piece immovably against a work holding member; and the entire vehicle is stabilized by means of hydraulic cylinders acting upon the vehicle axles.

---

This invention relates to a modification of a loader vehicle which increases the versatility of the loader. In particular, an application is seen for the use of this modified vehicle in the logging industry although other applications may easily be visualized.

The use of wheeled skidders for handling logs from stump to landing in logging operations has been known for some time. In the past, however, a second machine was required to load the logs onto trucks or other means for transportation to the mill. In such an operation, two machines were required, thereby increasing the contractor's costs and causing protracted periods of non-use of the loader unless the number of skidders was matched to the loader's capacity.

It is therefore an object of this invention to provide a machine which obviates the above described disadvantages of currently used machines.

It is also an object of this invention to provide, in combination, a loader-skidder.

It is a further object of this invention to provide a machine having a loading fork and bulldozer type blade on one end of the machine and a logging arch and winch on the opposite end.

It is also an object of this invention to provide such a machine having improved stability characteristics.

It is a further object of this invention to provide such a machine having a frame pivotally mounted on an axle wherein the ability of the machine to tip over is decreased by means of hydraulic cylinders acting between the vehicle body and the vehicle axles, thereby providing control of the degree of tilt of the machine when operating on slopes or when making turns.

Other objects of the invention will become apparent to those skilled in the art upon perusal of the following description of preferred embodiments thereof as depicted in the drawings which are intended to illustrate but not to restrict the scope of the invention. Other embodiments or equivalents of the invention will be obvious to those skilled in the art without departing from the scope of the invention as defined in the appended claims.

Referring now to the drawings.

Figure 1:
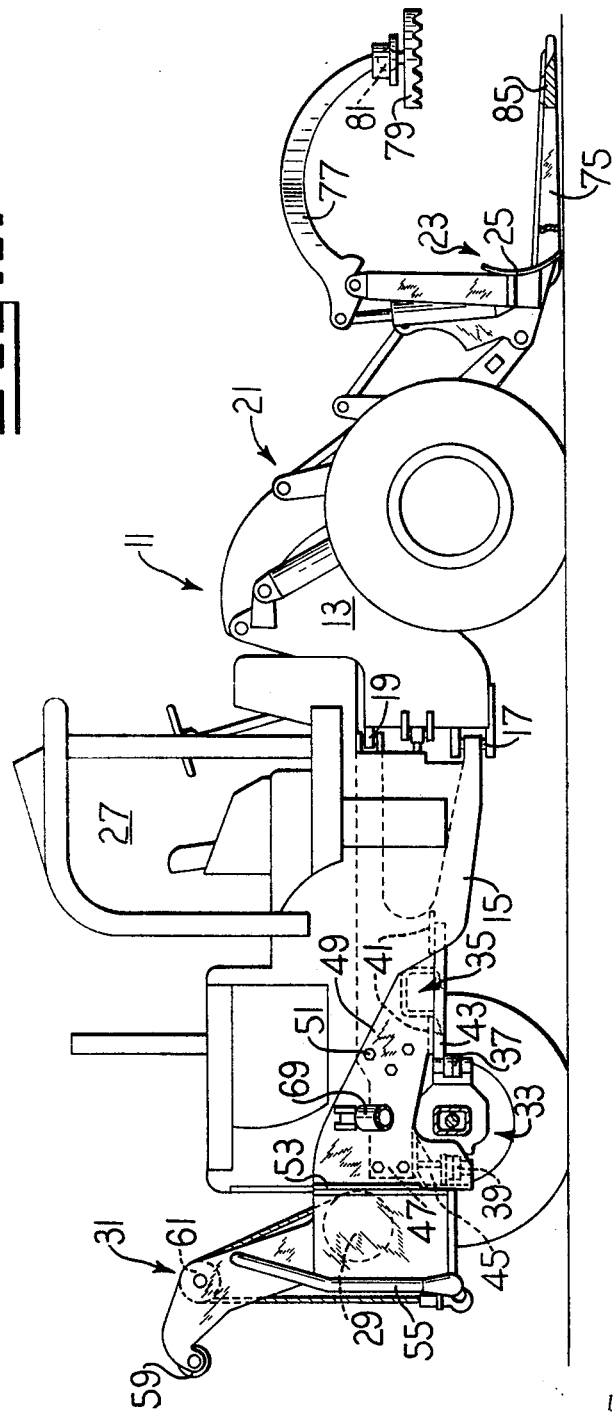
FIGURE 1 is a side elevational view, partly in section, of the vehicle of the present invention.

Referring now to the drawings in greater detail:

FIGURE 1 shows a tractor generally indicated at 11, having a front frame 13 and a rear frame 15 connected for articulated movement about pins 17 and 19. A conventional loader linkage 21 is connected to the front frame 13 and to a log fork 23 which has a bulldozer type blade 25 secured thereto.

Rear frame 15 supports an operator's compartment 27, an engine (not shown), and a logging winch 29 supported by a logging arch 31 which is secured to the rear frame 15.

Rear axle 33 has been moved rearwardly from its normal location shown at 35. In accomplishing this, trunnion mounting brackets 37 and 39 have been removed from their usual mounting pads 41 and heavy plates 43 have been fixed to the pads so that they extend rearwardly on each side of the machine to the point of mounting of the front trunnion bracket 37. A fabricated bracket 45 is attached to the lower side of a frame 47 for mounting the rear trunnion mounting bracket 39.

The frame members 49 are also a part of the above described fabricated bracket 45 and plates 43. These latter are fixed to frame 49 as by bolts 51 and the frames have outwardly extending flanges 53. The arch assembly 31 is bolted to the flanges 53 and the moving of the axle rearwardly provides a better support for the logging arch. Additionally, this manner of altering the original design of the axle trunnion brackets and frame allows the removal of the frame 51, etc. and the replacement of the axle in its normal position when the logging arch is removed.

Figure 2:
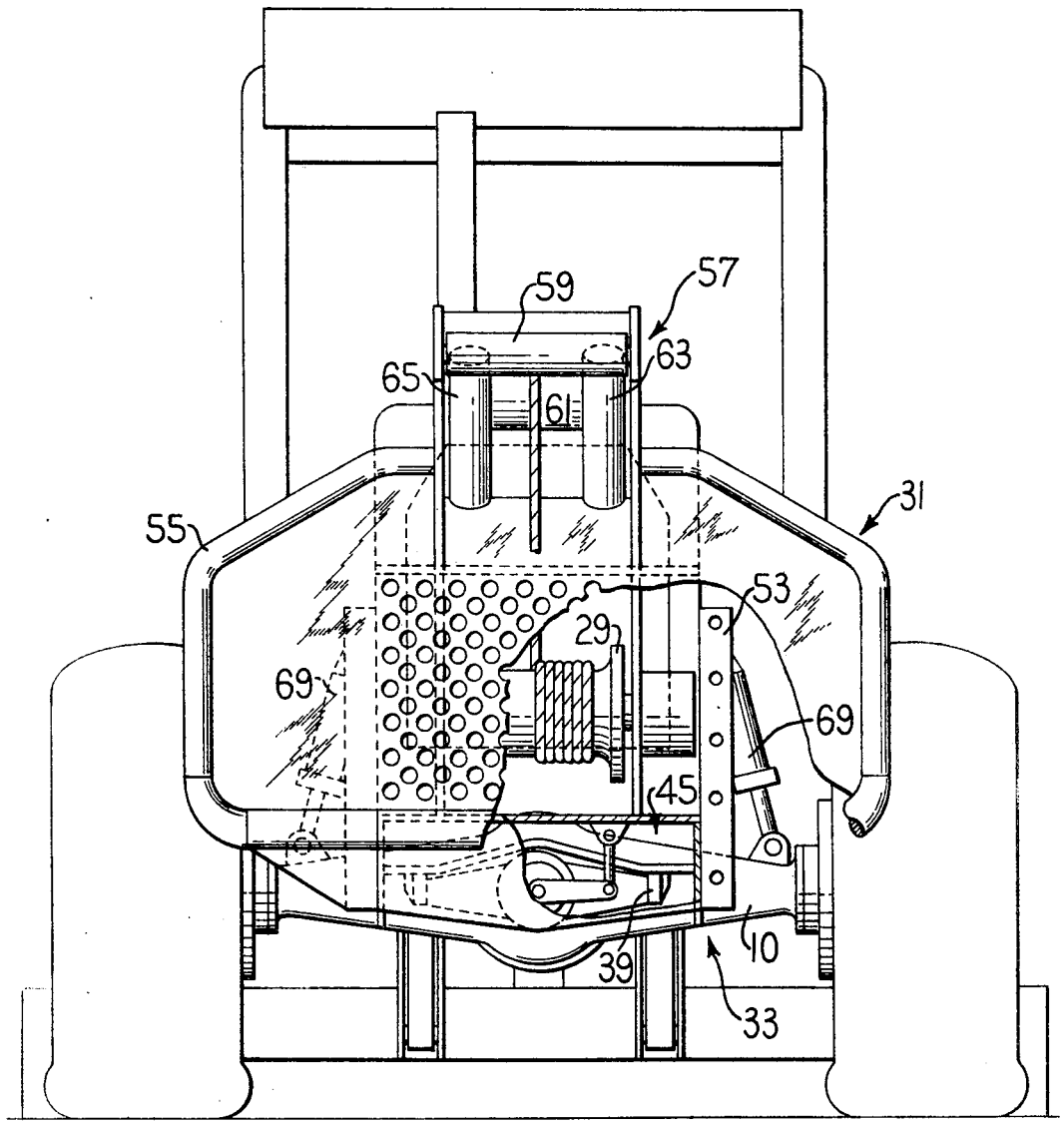
FIGURE 2 is a view taken from the left end of the vehicle of FIGURE 1 partly cut away to show details of the invention.

As shown in FIGURE 2, the arch has a fabricated structural frame 55 which supports a fairlead 57 containing guide rollers 59, 61, 63, and 65. The logging winch 29 may be a commercially available hydrostatically powered unit controlled by a valve connected to the loader hydraulic system.

Stabilizing jacks 69 are mounted to extend between the mounting frame 49 and the outer ends 10 of the axle 33. Hydraulic fluid to these jacks is controlled through a control mechanism which is described in a copending U.S. application Ser. No. 731,433, filed May 23, 1968, and assigned to the assignee hereof.

Figure 3:
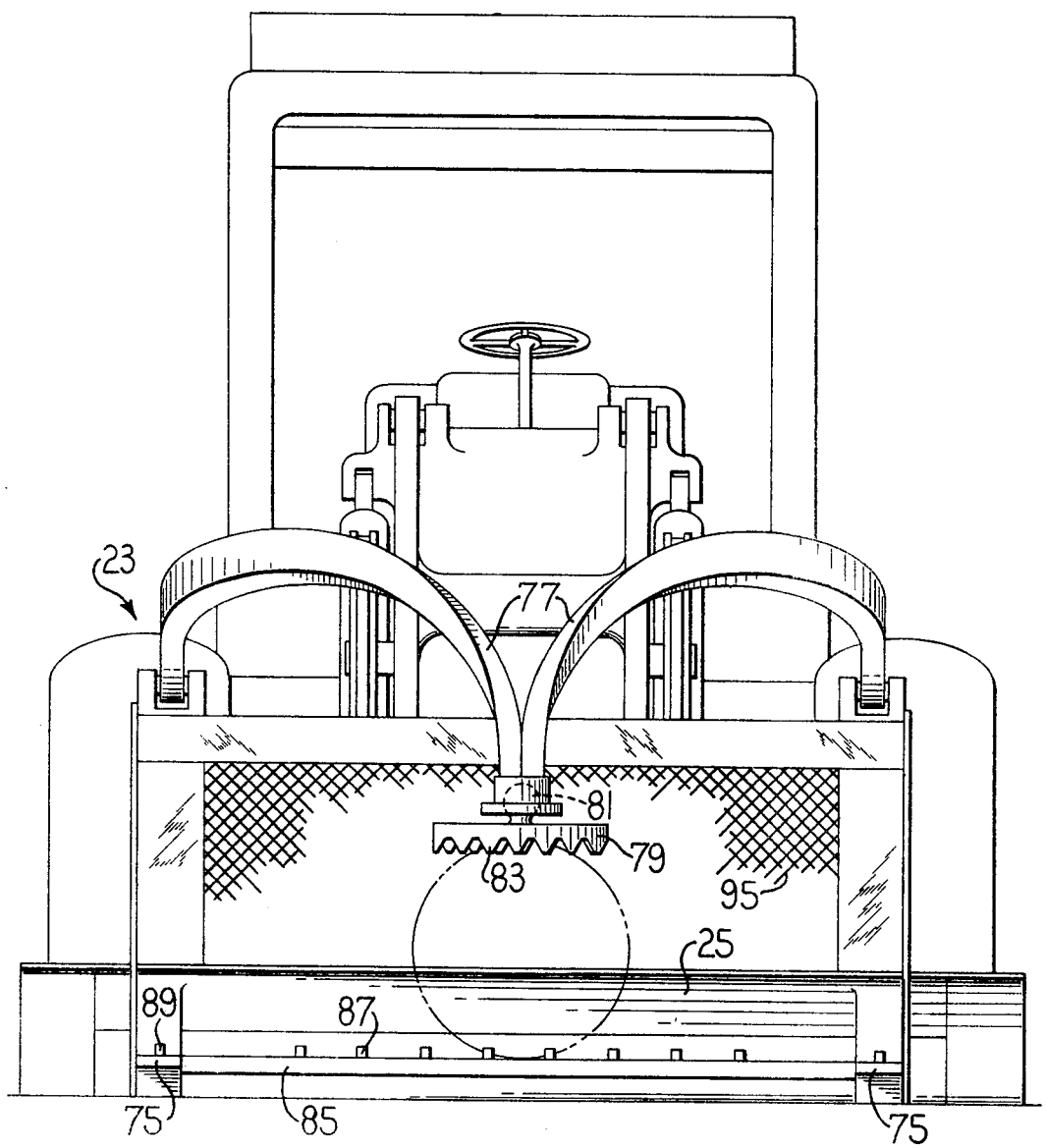
FIGURE 3 is a view taken from the right end of the vehicle shown in FIGURE 1.
Figure 4:
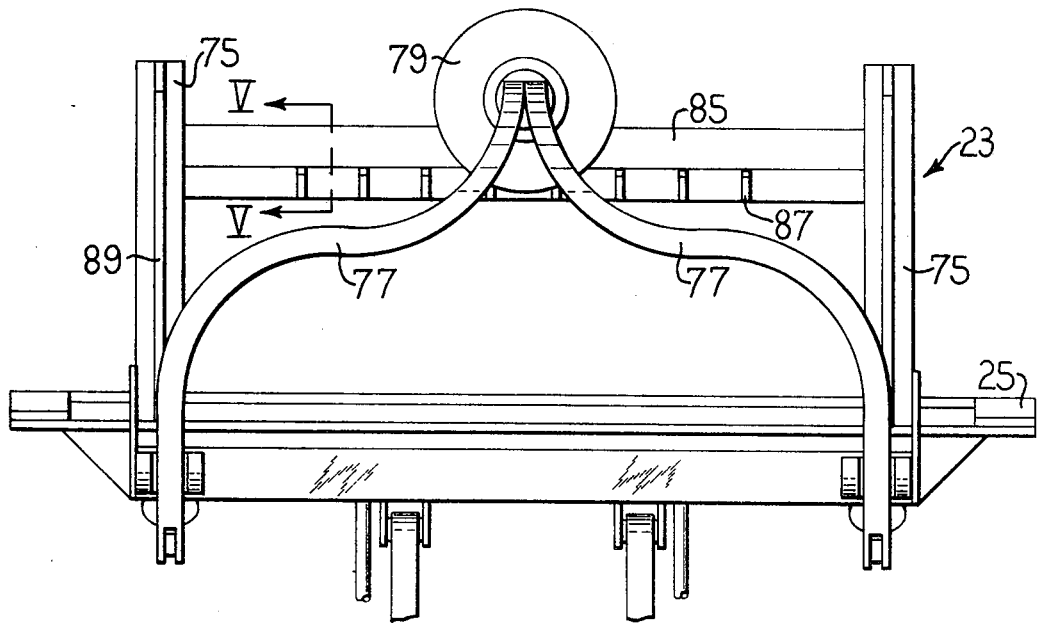
FIGURE 4 is a plan view of the loader portion of the vehicle.
Figure 5:
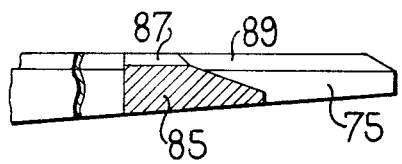
FIGURE 5 is a view taken along the line V—V of line 4.

Referring now to FIGURES 3 and 4 there is shown a log fork having tines 75 thereon. A pair of converging clamps 77 carry a disc-like member 79 universally connected to the clamps through a ball and socket connection 81. The underside of pressure disc 79 has a grate-like surface 83 which will bite into the bark of a log without extending through the bark and damaging the wood. A pressure disc with a grate-like surface on such a vehicle will also find use in many non-logging applications.

A carrying bar 85 extends horizontally between the tines 75 and has mounted thereon grouser-like gripping members 87 which also bite into the bark. Similar rib members 89 may be mounted on the tine 75 so as to resist sliding of the logs during loading operations.

Figure 6:
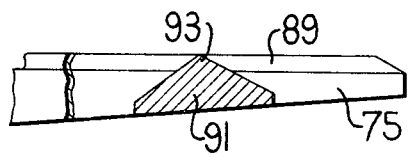
FIGURE 6 shows a view similar to line 5 of a modification of the loader portion of the vehicle.

In FIGURE 6 a modification of the cross-bar is shown wherein a bar 91 is constructed from an angular-shaped member such that an apex 93 will contact the underside of the log when clamped between the bar and tines and the pressure disc 79.

If desired, the rear of the fork may be enclosed with heavy wire mesh 95 between the upright portion of the tines so as to prevent logs from going between the forked tines when they are approached endwise in the manner shown in phantom in FIGURE 3. The wire may extend downwardly as far as the top of the grader blade 25.

Thus, the applicant has provided a true advancement in the art of work handling since the versatility of a known machine has been greatly increased. Having described preferred embodiments of the device, it must be understood that the invention is not to be limited to the precise details shown, but rather to the full range of alterations and equivalents available under the limitations set forth in the following claims.

What is claimed is:

1. In a vehicle, loading means thereon comprising a pair of generally horizontal fork tines, a crossbar extending between said fork tines intermediate the ends thereof, work gripping means on said cross-bar, converging clamp means fastened to said loading means for holding a workpiece against said crossbar, a pressure disc universally mounted on said converging clamp means, and a work gripping surface on said pressure disc in opposed relation to the work gripping means on said crossbar.

2. The vehicle of claim 1 wherein a bulldozer-type blade is mounted on said loading means, said blade having a lower edge which extends below the lower extremities of said tines.

References Cited

UNITED STATES PATENTS

| | | | |
|---|---|---|---|
| 2,418,251 | 4/1947 | Drott | 214—767 |
| 2,661,857 | 12/1953 | McNutt | 214—654 |
| 2,886,194 | 5/1959 | Codlin | 214—147 |
| 3,265,428 | 8/1966 | Gilbert et al. | 214—85.5 X |
| 3,349,932 | 10/1967 | Wagner | 214—138 |

HUGO O. SCHULZ, Primary Examiner

U.S. Cl. X.R.

37—117.5; 214—147, 654